Dec. 21, 1943.   R. B. McKINNIS   2,337,261
METHOD OF EXTRACTING OIL FREE NONOXIDIZED JUICE
Filed May 6, 1940   2 Sheets-Sheet 1

Inventor
RONALD B. McKINNIS

By Semmes, Keegin & Semmes
Attorneys

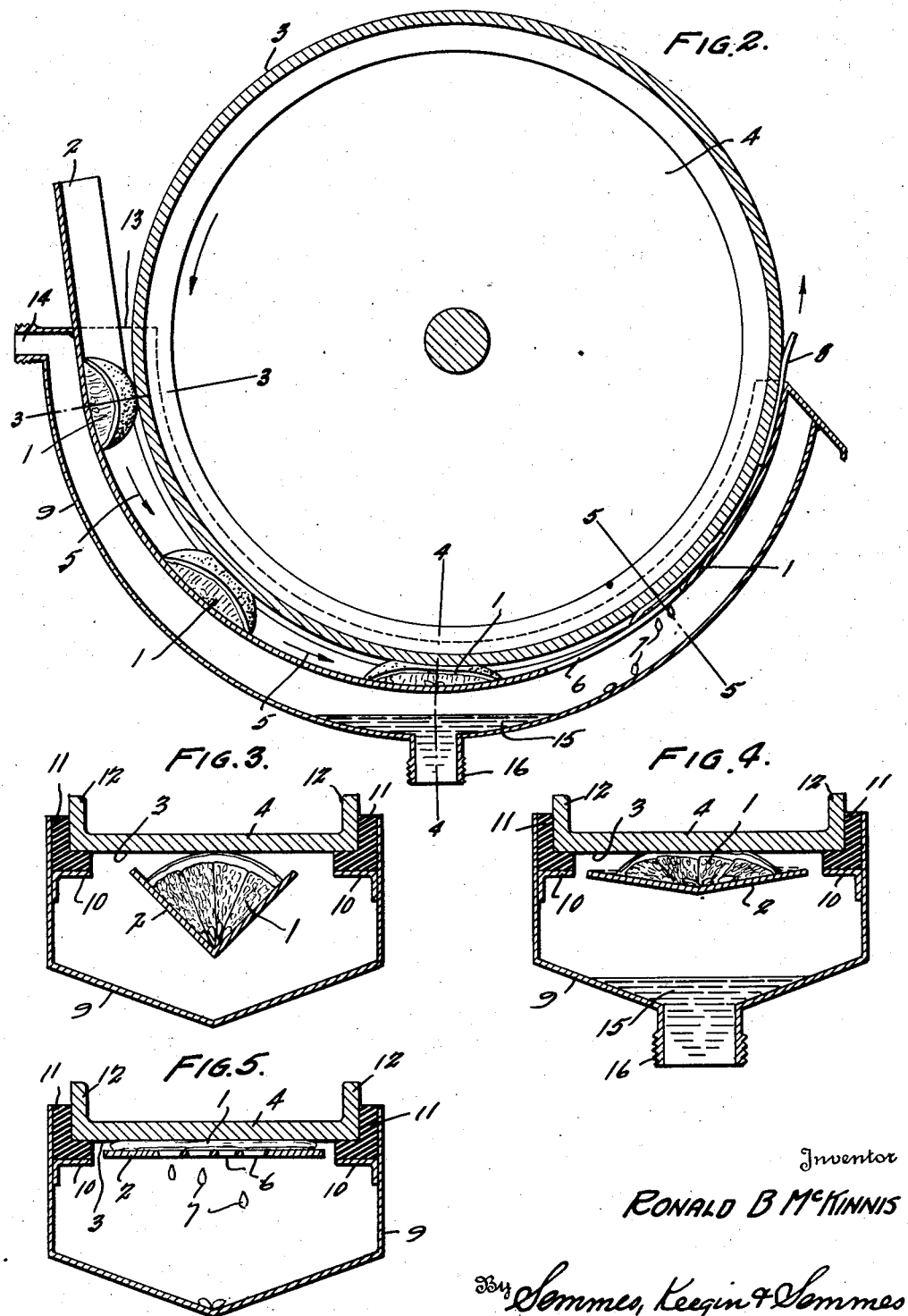

Patented Dec. 21, 1943

2,337,261

UNITED STATES PATENT OFFICE 2,337,261

METHOD OF EXTRACTING OIL-FREE NONOXIDIZED JUICE

Ronald B. McKinnis, Winter Haven, Fla., assignor, by mesne assignments, to Ronald B. McKinnis, doing business as McKinnis Foods, Winter Haven, Fla.

Application May 6, 1940, Serial No. 333,671

12 Claims. (Cl. 99—155)

This invention relates to a method of extracting juice from fruits and vegetables, and is particularly applicable to extraction of juice from citrus fruits, though it is not exclusively of use with fruits of that type.

One of the desirable features of a process for juice extraction is to provide means for obtaining substantially all of the juice, but without causing the juice to mix with the essential oils of the skin. If too much essential oil gets into the juice of oranges or grapefruit, the taste of the juice is objectionable.

Furthermore, it is desirable that the extracting be performed under non-oxidizing conditions. The delicate flavor and vitamin content of fruit juices is injured by exposure to the oxygen of the air. This deterioration occurs on relatively short exposure, and is progressive. That is to say, after the juice has been canned the deterioration of the flavor and vitamin content continues if oxidation processes have been initiated prior to canning.

Objects of the present invention are to provide a process which will be simple and inexpensive, and which will provide a juice which is substantially uncontaminated by the essential oils of the skin or peel.

A further object of the invention is to provide a process in which oxidation of the juices is substantially inhibited.

In general my process consists in extracting the juice from fruits and vegetables, such as citrus fruit, by cutting the fruit into small segments, for instance by quartering it, and then pressing these quartered sections. I maintain the peel in contact with one surface and the cut portion of the fruit in contact with another surface. Thus when the juice is expressed the essential oils found in the peel are prevented from coming into contact with the expressed juice. A guide means is provided for guiding the segments in their passage between the surfaces which perform the squeezing. This guide means may be in the form of a trough which fits the segment of fruit being extracted. For instance, where segments of quartered fruit are used the walls of the guideway will form substantially a 90° angle to each other at the start of the process. The guideway becomes flattened as the segment is pressed and a seed extracting section is provided. The whole operation is carried on in the presence of inert gas, such as carbon dioxide, nitrogen, or a mixture of the two, or other inert gases.

By making the segments of the fruit comparatively small, such as by quartering them, I am enabled to minimize the rupturing of the oil sacs in the peel. This feature of minimizing the rupturing of the oil sacs is accomplished first by gradually flattening out the peel during its passage through the squeezing mechanism, and secondly by having the peel area sufficiently small so that it does not have to be subjected to severe bending forces and thus the tendency of the oil sacs to rupture and discharge the essential oils is largely inhibited.

In the drawings:

Fig. 2 is a sectional view taken through a diagrammatic form of apparatus which I may employ;

Fig. 3 is a sectional view taken along the line 3—3 of Fig. 2;

Fig. 4 is a sectional view taken along the line 4—4 of Fig. 2;

Fig. 5 is a sectional view taken along the line 5—5 of Fig. 2.

Figure 1:
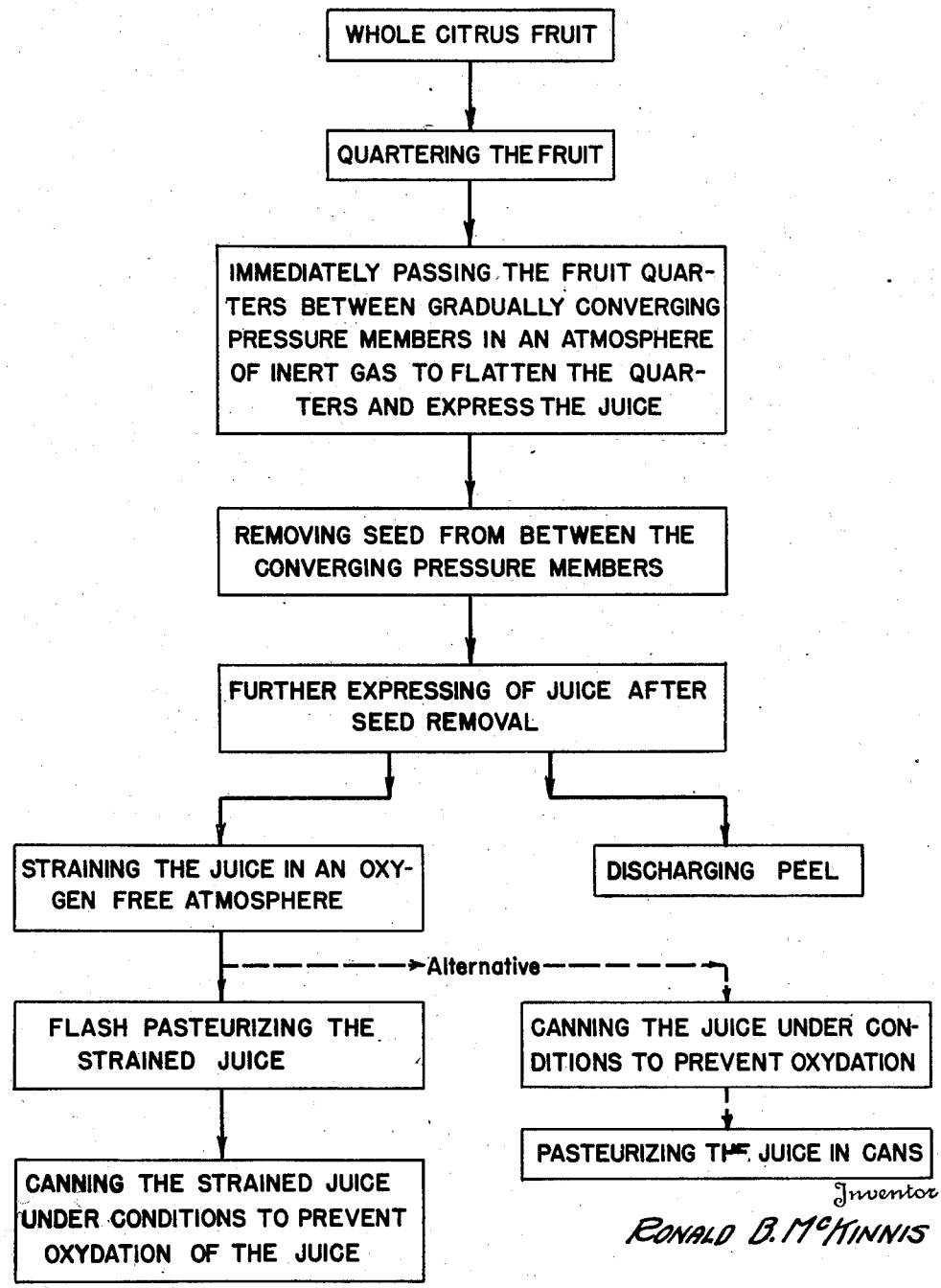
Figure 1 is a flow sheet illustrating one form of my process.

The whole citrus fruit, for instance where oranges are being extracted, is quartered, and the quartered sections, which I have shown by the numeral 1, are passed into a chute 2, whose sides form an angle with each other of approximately 90°, as is shown in Fig. 3. The seed sac side of the segment contacts the side walls of the chute 2, and the peel portion of the segment is adapted to bear against the periphery 3 of a rotating element 4. The movement of the rotating element 4 in the direction indicated by the arrow will cause the segments 1 of fruit to be carried along as illustrated by arrows 5. The trough 2 is gradually flattened out, as illustrated in Figs. 4 and 5. In Fig. 4 the angle formed by the sides of the trough 2 is shown to be about 170°. In Fig. 5 the trough has become flattened out.

During the passage of the segment 1 along the trough 2, the segment is gradually flattened, as illustrated in the drawings, until it reaches a position substantially opposite the line 5—5 of Fig. 2. There is formed in the relatively flat section 2 a series of elongated apertures 6 through which seeds 7 can be discharged. The flattened and fully extracted segment 1 is discharged in its flat form, as illustrated at 8 in Fig. 2.

The trough 2 is adapted to be housed in a housing 9 which is provided with interior shoulders 10 upon which rest packing element 11 against which bear the periphery 3 of the rotating element 4 and flanges 12 which are formed at right angles to the surface 3. Because of this construction there is a gas-tight fit between the rotating element 4 and the housing 9. At the point 13 where the end of the trough 2 projects outside of the casing 9, a suitable rubber flap, not shown, is provided, or some other construction which will permit the entrance of the segments of fruit 1 without permitting escape of a large quantity of the inert gas, such as $CO_2$, which is fed into the casing 9 through an aperture 14 formed therein.

The extracted juice and seeds are collected in a pool 15 formed at the lowermost point of the casing 9, and can be discharged through an outlet 16 formed at that point. Though the form of device diagrammatically illustrated is adapted to receive quartered fruit, it is obvious that fruit of other size than quarter size may be used. It is desirable that the cut surface of the fruit contact the sides of the chute or trough 2, but this is not absolutely necessary as the pressure exerted by the operation is such as to cause the cut surface of the fruit to quickly conform to the shape of the trough 2. Obviously some carbon dioxide or other inert gas will be lost at the point 13, but since the pressure of the inert gas is not high and also by reason of the flap provided at this point undue loss of inert gas is obviated.

After the juice leaves the aperture 16 at the bottom of the apparatus, it is strained in an oxygen free atmosphere, preferably in an atmosphere of inert gas, and may either then be canned under non-oxidizing conditions and then pasteurized in the containers, or alternately the strained juice may be flash pasteurized and canned under conditions to prevent oxidation of the juice.

While I have shown diagrammatically one form of my process, it is obvious that other forms of process may be employed which lie within the spirit of the invention, and I therefore desire that the invention be limited only by the scope of the appended claims and the showing of the prior art.

I claim:

1. In a method of extracting juice from citrus fruit, cutting the whole fruit into wedge sections, and gradually flattening the sections by pressure exerted in the direction normal to the peel surface of the sections to extract the juice without rupturing the peel under non-oxidizing conditions.

2. In a method of extracting juice from citrus fruit, cutting the whole fruit into wedge sections, passing the sections into an atmosphere of inert gas and flattening gradually the sections while in the atmosphere of inert gas by pressure exerted in the direction normal to the peel surface of the sections to extract the juice without rupturing the peel.

3. In a method of extracting juice from citrus fruit, cutting the fruit into wedge sections, and moving the sections between converging surfaces with one of said surfaces in engagement with the peel surface of the wedge sections to flatten gradually the sections to extract the juice without rupturing the peel under non-oxidizing conditions.

4. A method of extracting juice from citrus fruit comprising the steps of quartering the fruit, and flattening gradually the quartered fruit by pressure exerted in the direction normal to the peel surface of the sections to extract the juice without rupturing the peel in an atmosphere of inert gas.

5. A process of extracting juice from citrus fruit comprising cutting the fruit into wedge sections, moving the sections into an atmosphere of inert gas, passing the sections between a movable surface and a stationary surface forming a gradually decreasing passageway with the surface of the peel in contact with the movable surface thereby extracting the juice by pressure without rupturing the peel in the atmosphere of inert gas.

6. A process of extracting juice from citrus fruit comprising cutting the fruit into wedge sections, moving the sections into an atmosphere of inert gas, passing the sections between a movable surface and a stationary surface forming a gradually decreasing passageway with the surface of the peel in contact with the movable surface thereby extracting the juice by pressure without rupturing the peel in the atmosphere of inert gas and discharging the peel from the passageway after the juice has been extracted.

7. A process of extracting juice from citrus fruit comprising quartering the fruit, passing the quartered fruit between a movable surface and a stationary surface that gradually converges towards the movable surface with the peel surface of the fruit in contact with the movable surface thereby extracting the juice by pressure without rupturing the peel in the presence of an inert gas.

8. A process of extracting juice from citrus fruit comprising quartering the fruit, passing the quartered fruit between a movable surface and a stationary surface that gradually converges toward the movable surface with the peel surface of the fruit in contact with the movable surface thereby extracting the juice by pressure without rupturing the peel in the presence of an inert gas, and discharging the peel from the surface after the juice has been extracted.

9. In a method of extracting juice from citrus fruit the steps of cutting the fruit into wedge sections, passing the cut sections into a non-oxidizing atmosphere and flattening gradually the sections in the non-oxidizing atmosphere by pressure exerted in a direction normal to the peel surface of the wedge sections to extract the juice without rupturing the peel, collecting the extracted juice in a non-oxidizing atmosphere and discharging the peel after the juice has been extracted.

10. In a method of extracting juice from citrus fruit the steps of cutting the fruit into wedge sections, moving the sections into an atmosphere of inert gas, passing the sections between a movable surface and a stationary surface forming a gradually decreasing passageway with the peel surface in contact with the movable surface thereby extracting the juice by pressure without rupturing the peel in the atmosphere of inert gas, collecting the extracted juice in a zone of inert gas thereby preventing its oxidation, and discharging the peel from the passageway after the juice has been extracted.

11. In a method of extracting juice from citrus fruit comprising the steps of quartering the whole fruit, passing the quartered fruit between a movable surface and a stationary surface that gradually converges toward the movable surface with the peel surface of the quartered fruit in contact with the movable surface, thereby extracting the juice by pressure without rupturing the peel in the presence of an inert gas, collecting the extracted juice in the presence of an inert gas and thereby preventing oxidation of the juice, and discharging the peel from the surface after the juice has been extracted.

12. A method of extracting juices from citrus fruit comprising cutting the whole fruit into wedge sections, passing the sections into an atmosphere of inert gas, moving the sections lengthwise between a movable surface and a stationary surface which gradually converges toward the movable surface with the peel surface of the sections in frictional engagement with the movable surface and the cut surface of the sections supported by the stationary surface for sliding movement with respect thereto, thereby gradually flattening the sections while straightening the peel to extract the juices without rupturing the peel in the atmosphere of inert gas.

RONALD B. McKINNIS.